Feb. 19, 1957 C. C. SHUMARD 2,782,373

SIGNAL-AMPLITUDE RESPONSIVE CIRCUIT

Filed Dec. 31, 1953 2 Sheets-Sheet 1

INVENTOR.
CHARLES C. SHUMARD

BY Morris L. Rabkin

ATTORNEY

Feb. 19, 1957 C. C. SHUMARD 2,782,373

SIGNAL-AMPLITUDE RESPONSIVE CIRCUIT

Filed Dec. 31, 1953 2 Sheets-Sheet 2

INVENTOR.
CHARLES C. SHUMARD
BY Morris L. Rabkin
ATTORNEY 2,782,373
Patented Feb. 19, 1957

2,782,373

SIGNAL-AMPLITUDE RESPONSIVE CIRCUIT

Charles C. Shumard, Hopewell, N. J., assignor to Radio Corporation of America, a corporation of Delaware Application December 31, 1953, Serial No. 401,659
6 Claims. (Cl. 332—11)

Figure 1:
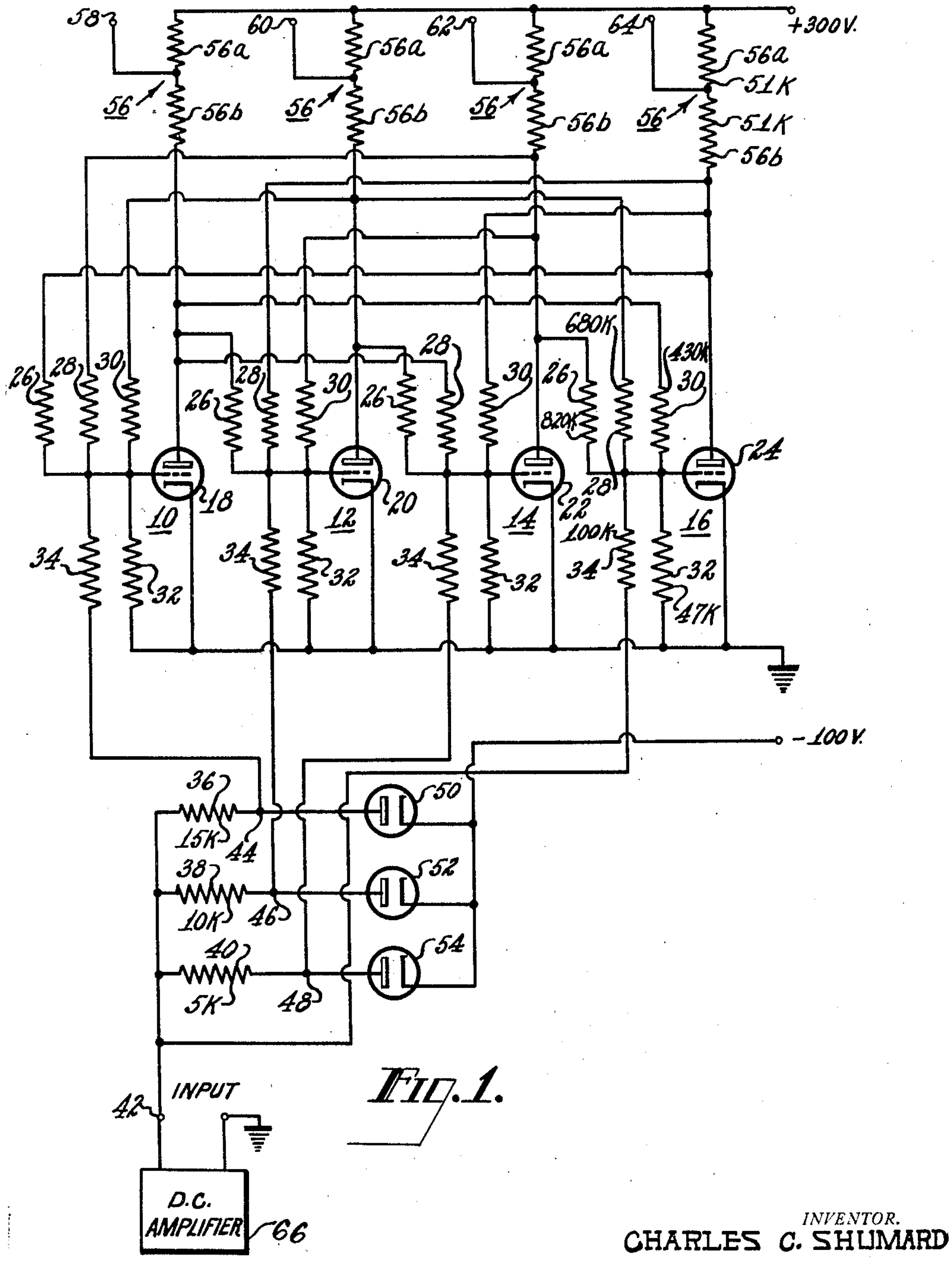

This invention relates to electrical translation systems for electrical signals of varying amplitude, and particularly to electronic circuits for classifying or quantizing in accordance with its amplitude.

Quantizing circuits in the computer field are sometimes used to convert signals in analogue form to a digital form. For example, the reading of an instrument in the form of a voltage of varying amplitude may be converted to a signal on one of a plurality of channels in accordance with the voltage amplitude. Different switching operations may be initiated depending upon the channel to which the signal is applied. Quantizing circuits are described in U. S. Patents Nos. 2,486,390, and 2,541,039.

In some applications of a quantizing circuit, it is desirable that there be a "backlash" or hysteresis operational characteristic of the circuit. That is, as the circuit input voltage increases through discrete levels, the signal is applied successively to the output channels in a predetermined order; and as the voltage decreases through the same or overlapping voltage levels, the signal is applied to the next higher order channels. A circuit having a backlash characteristic may be used where there is a feedback control of the input in accordance with the discrete output channel selected. By means of the backlash characteristic and a feedback network, it is possible to provide an interpolation between two discrete output channels for a voltage that lies between the two corresponding levels. The article "A high-accuracy time-division multiplier" by E. A. Goldberg, RCA Review, September 1952, pp. 265–274, describes a feedback circuit in which interpolation is achieved by means of a flip-flop circuit that is a two-position quantizing circuit having a backlash characteristic. A backlash quantizing circuit having more than two positions is described in the co-pending patent application of E. A. Goldberg, entitled "Signal-Amplitude Responsive Circuit," Serial No. 401,682, filed concurrently herewith.

An object of this invention is to provide a new and improved circuit for providing a signal on one of a plurality of outputs in accordance with the amplitude of a varying voltage.

Another object of this invention is to provide an improved and simple circuit that assumes a plurality of different states in accordance with amplitude variations of a direct voltage.

Another object of this invention is to provide a reliable and accurate circuit having a backlash characteristic for quantizing a varying electrical signal in accordance with its amplitude.

In accordance with this invention, a plurality of grid-controlled electron tubes are connected in order. The anode of each tube is coupled through separate resistors to the grids of all the other tubes. Separate load resistors and separate output terminals are connected to each tube anode. The tube grids are connected to an input terminal through separate grid resistors and separate input resistors in series. An input resistor is not needed for the last tube. The input resistors decrease in magnitude from the first to the penultimate tube. Connected to the junctions of the grid and input resistors are separate diode limiter circuits. The diode limiters prevent the junction voltages from rising above that required to bias the tubes to full conduction.

At the low extreme of the input voltage range, all the tubes are biased to cut-off condition through the voltage-divider biasing system formed by the load, coupling, grid and input resistors. The tube grids are biased more negatively from the first to the last in amounts equal to the different voltage drops across the different magnitude input resistors. As the input voltage increases through steps equal to the differences of the input resistor voltage drops, the tubes are successively biased to conduction from the first to the last. When the second tube conducts, the lowered anode voltage is applied through a coupling resistor to the first tube grid and regeneratively biases the first tube to cutoff. Similarly, when the succeeding tubes conduct, all of the preceding tubes in order are cut off. Only one tube conducts at a time, and the anode voltage of the conducting tube is low while the others are high. Thus, only one output terminal is at a low voltage and the others are at a high voltage. The order of the low voltage terminal is related to the input voltage amplitude, and the low voltage signal may be used for control purposes.

When the input voltage decreases, the tubes are successively biased to cutoff in reverse order. When a tube is conducting, its grid voltage is at a relatively more positive value due to the high anode voltages of all the other non-conducting tubes that are applied through the coupling resistors. When a tube is cut off and the preceding tube is conducting, the non-conducting tube grid is at a relatively more negative voltage due to the low anode voltage of the preceding conducting tube. Consequently, the increasing input voltage at which it is cut off. Thus, there is backlash in the operation of the circuit. The backlash characteristic may be made relatively large or negligible depending on the relative magnitudes of the coupling and other biasing resistors.

Figure 2:
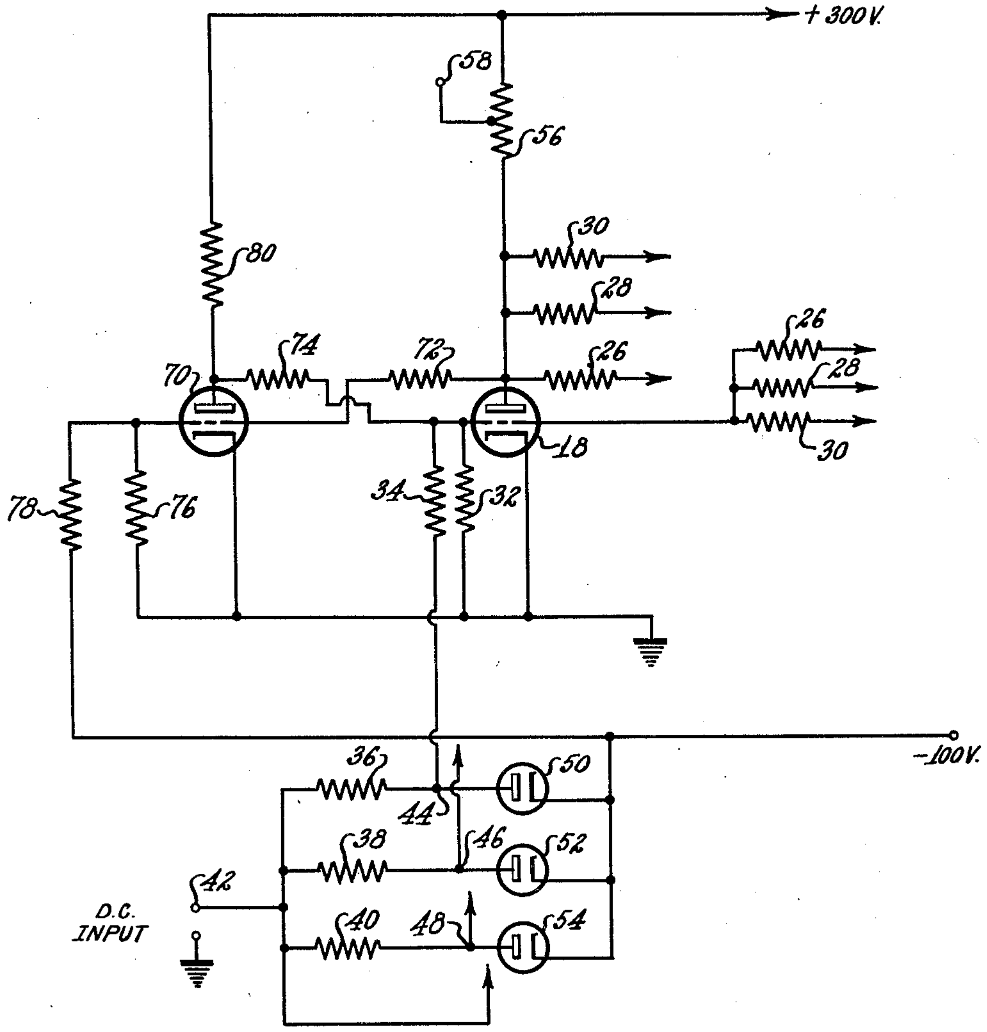

The foregoing and other objects, the advantages and novel features of this invention, as well as the invention itself, both as to its organization and mode of operation, may be best understood when read together with the accompanying drawing in which like reference numerals refer to like parts and in which Figure 1 is a schematic circuit diagram of an embodiment of this invention; and Figure 2 is a schematic circuit diagram illustrating a modification of the embodiment shown in Figure 1.

Referring to Figure 1, a quantizing circuit in accordance with this invention has a plurality of stages 10, 12, 14, 16, each including a grid-controlled electron tube 18, 20, 22, 24. Four stages are shown in Figure 1 for simplicity of illustration. However, the invention may be applied to a greater or lesser number of stages where desired. The anode of each tube 18—24 is coupled to the grids of all the other tubes through three separate coupling resistors 26, 28, 30. The control grid of each tube 18—24 is connected through a separate first grid resistor 32 to ground. The cathode of each tube 18—24 is connected to ground. The control grids of the first, second and third tubes, 18, 20, 22 are connected through separate second grid resistors 34 and separate input resistors 36, 38, 40 in series therewith to an input terminal 42. The junctions 44, 46, 48 of the second grid resistors 34 and input resistors 36, 38 and 40 are the biasing points or inputs for the associated tube grids. The grid of the fourth tube 24 is connected through its second grid resistor 34 directly to the input terminal 42 which is the biasing point for that tube 24. The junctions 44, 46, 48 of the second grid resistors 34 and input resistors 36, 38 and 40 are connected, respectively, to the anodes of three separate diode limiter tubes 50, 52, 54. The diode 50, 52, 54 cathodes are connected to a negative direct voltage, —100 volts. The tube anodes are connected through separate anode loads 56 to a source of operating potential, +300 volts. Each anode load 56 is made up of two different resistors 56*a*, 56*b* in series. Each junction of the two resistors 56*a*, 56*b* is connected to a separate output terminal 58, 60, 62, 64. The input voltage source may be a D. C. amplifier 66.

The coupling resistors 26, 28, 30 from the first tube 18 anode to the grids of the succeeding tubes vary in magnitude, the first or largest resistor 26 being connected to the second tube 20 grid, the second or intermediate magnitude resistor 28 to the third tube 22 grid, and the third or smallest resistor 30 to the fourth tube 24 grid. The magnitudes of the first, second and third coupling resistors 26, 28, 30 from the second tube 20 anode are the same as the corresponding ones from the first tube 18 anode, with the first resistor 26 connected to the third tube 14 grid, the second resistor 28 to the fourth tube 24 grid, and the third resistor 28 to the first tube 18 grid. The three coupling resistors 26, 28, 30 from each of the anodes of the third and fourth tubes 22, 24 have corresponding magnitudes and are arranged in the same manner. Thus, there is a symmetrical coupling resistor network to each tube grid made up of a first, a second, and a third resistor 26, 28, 30, each such resistor being connected to a separate one of the three other tube anodes. The first input resistor 36 to the first tube 18 grid is largest in magnitude, the second resistor 38 is intermediate in value, and the third resistor 40 is smallest in value. The load resistors 56, coupling resistors 26, 30, grid resistors 32, 34, and input resistors 36, 40 form a voltage-dividing biasing network.

In operation, at the low extreme of the input voltage range, —120 volts for the specific component values shown in Figure 1, the voltages at the different biasing points 44, 46, 48, 42 are respectively —105, —110, —115, and —120 due to the voltage drops across the three input resistors 36, 38, 40. All the tubes 18—24 are biased to cutoff by the above biasing point voltages. When the voltage at each of the biasing points 42—48 increases to —100 volts, the associated tube grid is at approximately zero bias and the tube conducts. As the input voltage increases, becoming less negative, the first tube 18 conducts. A further input voltage increase results in the second tube 20 conducting, and a simultaneous rapid cutoff of the first tube 18. As the voltage continues to rise to the high extreme of its range, the third and fourth tubes 22, 24 are successively rendered conductive and all the preceding tubes cut off. As the voltage decreases from the high range extreme, there is a reversal in the order of conduction of the tubes from the fourth tube 24 to the first tube 18, and the final non-conduction of all of them. Only one tube conducts at a time. Therefore, the junctions of the conducting tube anode resistors 56*a*, 56*b* and the corresponding output terminal 58—64 are at a low potential, while all the other output terminals are at a high potential. This low voltage output signal is directly related to the input voltage amplitude and may be used for control purposes. Where it is desired that the output signal be a high voltage, a separate inverter amplifier stage (not shown) may be connected to each output terminal.

When the input voltage increases to a level at which the second tube 20 biasing point 46 voltage is the triggering-on voltage of —100 volts, the first biasing point 44 is held at —100 volts due to conduction in the first limiter diode 50. There is zero bias on the second tube 20 grid so that the second tube 20 starts to conduct. The resulting fall in the second tube 20 anode potential is applied to the first tube 18 grid through the third coupling resistor 30, tending to cut that tube off. The resulting rise in the first tube 18 anode potential is regeneratively applied to the second tube 20 grid. The action continues until the second tube is conducting and the first tube 18 is cut off. The second tube 20 third coupling resistor 30 is smaller than the third tube 22 second coupling resistor 28 and the fourth tube 24 first coupling resistor 26. Therefore, the voltage division to the first tube 18 grid from the low-potential second tube 20 anode and the high-potential third and fourth tube 22, 24 anodes, as well as the limiting action of the first diode 50, permit a relatively small second tube 20 anode swing to cut off the first tube 18. In a similar manner, when the input voltage increases sufficiently to bring the third tube biasing point 48 to the triggering-on voltage of —100 volts, the third tube 22 conducts, cutting off the second tube 20 through the third tube 22 third coupling resistor 30 and holding the first tube 18 cut off through the third tube 22 second coupling resistor 28. When the input voltage increases to —100 volts, the fourth biasing point 42 is at the triggering-on voltage. The fourth tube 24 conducts, and the preceding tubes 18, 22 are cut off because of the bias supplied by the fourth tube 24 and the action of the limiting diodes 50, 52, 54. All the tubes, except the first tube 18, are regeneratively triggered on as the input voltage increases.

When the input voltage decreases from —100 volts, becoming more negative, the tubes 18—24 are rendered conductive sequentially in the reverse direction. All the tubes, except the first tube 18, are regeneratively triggered off as the input voltage becomes more negative. Considering the condition of the circuit with the input voltages at —100 volts, the fourth tube is conducting, and the other tubes are cut off. As the input voltage decreases, becoming more negative, the bias on the grids of the first, second and third tubes 18, 20, 24 remains at cutoff, due to the limiting diodes 50—54 and the bias supplied by the fourth tube 24 anode. When a value of the input voltage is reached at which the fourth tube starts to cut off, the fourth tube 24 anode does not supply enough bias to keep the third tube 22 non-conducting. Therefore, the third tube 22 starts to conduct, supplying the additional cutoff bias to the first and second tubes 18, 20 formerly supplied by the fourth tube 24. The third tube 22 also regeneratively cuts off the fourth tube 24. The same process is repeated for the other tubes 18, 20 as the input voltage becomes more negative, execpt that the cutoff of the first tube 18 is not regenerative.

The biasing point 46, 48, 42 voltage for triggering off all the tubes, except the first tube 18, when the input voltage is decreasing, is somewhat more negative than the biasing point voltage for triggering on the same tube when the input voltage is increasing. For example, when the third tube 22 is conducting, its anode is at a relatively low potential which tends to bias the fourth tube 24 grid to a relatively low voltage. When the fourth tube 24 is the only one conducting, all the other tube 18, 22 anodes are at a relatively high potential which tends to bias the fourth tube 24 grid to a relatively high voltage. Thus, the fourth tube 24 grid tends to be biased less negatively by the third tube 22 anode potential when the fourth tube 24 conducts and more negatively when the third tube 22 conducts. Consequently, the biasing point 42 voltage necessary to trigger off the fourth tube 24 is more negative than that which triggers on the fourth tube 24. The backlash between the triggering-on and triggering-off voltages is also characteristic of the third and second tubes 22, 20. However, there is no backlash in the first tube 18 trigger voltages, in the circuit shown in Figure 1, because the second, third and fourth tubes 20, 22, 24 are cut off for both first tube 18 conditions. The backlash characteristic of the circuit depends on the relative magnitudes of the coupling and other biasing network resistors. By appropriate choice of resistor values, the amount of backlash may be made large or negligible.

The input voltage steps for producing triggering-on potentials at successive biasing points 44, 46, 48, 42 are substantially equal for equal steps in input resistor 36, 38, 40 magnitudes. The relatively small values of the different magnitude input resistors do not materially affect the substantially equal currents flowing in the corresponding, symmetrical, biasing network sections. The magnitude of the input voltage steps may be made large or small by appropriate choice of input resistor 36, 38, 40 magnitudes.

Additional stages (not shown) may be added to circuit, as desired. Each additional stage would have the same form as those shown in Figure 1. The specific component values given in Figure 1 are illustrative and are not to be construed as a limitation on the scope of the invention. The tube types are: triodes, ½ 6S47; diodes, ½ 6AL5. Corresponding components in each stage have the same parameters except where values are otherwise given.

In Figure 2, a modified circuit embodying this invention is shown. The first tube 18 is connected in a bistable multivibrator or flip-flop circuit with an additional grid-controlled tube 70. The first tube 18 anode is connected through a coupling resistor 72 to the additional tube 70 grid. The additional tube 70 anode is connected through a coupling resistor 74 to the first tube 18 grid. The additional tube 70 grid is connected through first and second grid resistors 76, 78, respectively, to ground and the −100 volt source. The additional tube 70 anode is connected to the +300 volt source through an anode resistor 80. The circuit shown in Figure 2 is otherwise the same as that of Figure 1, and the other tubes 20, 22, 24 are omitted for simplicity of illustration.

When the input voltage is at the negative extreme, about −120 volts, the biasing point 42—48 voltages are all below the triggering-on potential of −100 volts. Therefore, the first, second, third, and fourth tubes 18—24 are cut off. The additional tube 70 second grid resistor 78 is connected to the negative source at the triggering-on potential, −100 volts. Therefore, the additional tube 70 is conducting. When the first biasing point 44 voltage rises to −100 volts, the first tube 18 conducts and cuts off the additional tube 70 regeneratively. Similarly, for a decreasing input voltage, the first tube 18 is regeneratively cut off in the same manner as the other tubes 20, 24. Because the additional tube 70 anode potential is relatively low when that tube 70 conducts, there is a backlash between the first tube 18 triggering-on and triggering-off potential.

It is evident from the above description of this invention that a simple and reliable quantizing circuit is provided that has a backlash characteristic or not as desired. A large or a small number of stages may be employed with a relatively small number of components.

What is claimed is:

1. A circuit that assumes at least three different states in accordance with amplitude variations of an input voltage, said circuit comprising at least three voltage responsive electron control devices arranged in a predetermined operational order, each of said control devices having anode, cathode and control electrodes and conductive and non-conductive operating conditions, separate impedance means coupling each of said device anodes to said control electrode of each of the others of said devices, separate input terminals coupled to said control electrodes, and input means for applying a different voltage to each of said input terminals in accordance with the amplitude of said input voltage to bias said control devices in said order to one of said operating conditions as said input voltage varies in one direction and in the reverse order as said input voltage varies in the opposite direction.

2. A circuit according to claim 1 wherein said input means includes means for limiting the voltages at said input terminals.

3. A circuit according to claim 1 wherein each of said separate coupling impedance means includes a resistor, at least one of said resistors from each of said control device anodes having a different magnitude than the others, said different magnitude resistors being connected to said control grids of succeeding order control devices, and said input means includes a plurality of different magnitude resistors respectively connected to different ones of said input terminals, and separate limiting diodes connected to said input terminals.

4. A circuit that assumes at least three different states in accordance with amplitude variations of an input voltage, said circuit comprising at least three voltage responsive electron control devices each having two conditions of operation and an input terminal, means for biasing each of said control devices to change from one operating condition to the other upon the application of a first predetermined voltage and to change from said other to said one operating condition upon the application of a second predetermined voltage substantially different from said first voltage, and input means for applying different voltages to said input terminals in accordance with said input voltage, said input means including means for limiting the amplitude of the voltages applied to said input terminals.

5. A circuit that assumes at least three different states in accordance with amplitude variations of an input voltage, said circuit comprising at least three voltage responsive electron control devices arranged in a predetermined operational order, each of said control devices having conductive and non-conductive operating conditions and including anode, cathode and control electrodes, separate input terminals coupled to said control electrodes, means for biasing each of said control devices to change from one of said operating conditions to the other upon the application of a first predetermined voltage to the associated input terminal and to change from said other to said one operating condition upon the application of a second predetermined voltage substantially different from said first voltage, said biasing means including separate resistors coupling each of said device anodes to said control electrode of each of the others of said devices, at least some of said resistors coupled to each anode being different in magnitude than the others, all of said different magnitude resistors being coupled in a symmetrical arrangement, and input means for applying voltages to said input terminals in accordance with said input voltage, said input means including a plurality of different magnitude resistors respectively connected to different ones of said input terminals, and separate limiting diodes connected to said input terminals.

6. A circuit that assumes at least three different states in accordance with amplitude variations of an input voltage, said circuit comprising at least three electron discharge tubes arranged in an operational order from a first one of said tubes to a last one of said tubes, each of said tubes having an anode, cathode and control grid, separate different magnitude resistors coupling the anode of each of said tubes to said control grid of each of the other tubes, said resistors from the anode of said first tube decreasing in magnitude with the order of the tube to the control grid of which it is coupled, each of the pluralities of resistors from the anodes of said other tubes decreasing in magnitude with the order of the tube to the control grid of which each resistor is coupled, said order being cyclical continuing from said last tube back to said first tube to provide a symmetrical coupling resistor network, a common input terminal, separate means coupling said common input terminal to said control grids, each of said separate means for at least said first and second control grids including a different magnitude input resistor connected at one end to said common input terminal, separate limiting diodes connected to the other ends of said input resistors, and separate output terminals connected to said anodes.

References Cited in the file of this patent

UNITED STATES PATENTS

| | | |
|---|---|---|
| 2,541,039 | Cole | Feb. 13, 1951 |
| 2,589,465 | Weiner | Mar. 18, 1952 |
| 2,594,092 | Taylor | Apr. 22, 1952 |
| 2,612,550 | Jacobi | Sept. 30, 1952 |